(12) United States Patent
Chen

(10) Patent No.: US 12,208,600 B2
(45) Date of Patent: Jan. 28, 2025

(54) PREHEATING-FREE LAMINATOR

(71) Applicant: BONSEN ELECTRONICS LIMITED, Dongguan (CN)

(72) Inventor: Wenhui Chen, Dongguan (CN)

(73) Assignee: BONSEN ELECTRONICS LIMITED, Dongguan (CN)

( * ) Notice: Subject to any disclaimer, the term of this patent is extended or adjusted under 35 U.S.C. 154(b) by 0 days.

(21) Appl. No.: 17/633,290

(22) PCT Filed: Aug. 10, 2021

(86) PCT No.: PCT/CN2021/111795
§ 371 (c)(1),
(2) Date: Feb. 9, 2023

(87) PCT Pub. No.: WO2023/010596
PCT Pub. Date: Feb. 9, 2023

(65) Prior Publication Data
US 2024/0051285 A1    Feb. 15, 2024

(30) Foreign Application Priority Data

Aug. 2, 2021 (CN) .......................... 202110880652.9

(51) Int. Cl.
*B32B 37/06* (2006.01)
*B32B 37/00* (2006.01)
*B32B 38/18* (2006.01)

(52) U.S. Cl.
CPC .......... *B32B 37/06* (2013.01); *B32B 37/0053* (2013.01); *B32B 38/18* (2013.01); *B32B 2037/0061* (2013.01)

(58) Field of Classification Search
CPC ............ B32B 2037/0061; B32B 41/00; B32B 2309/02; B32B 2309/04; B32B 2309/14; B32B 37/06; B32B 37/0053
(Continued)

(56) References Cited

U.S. PATENT DOCUMENTS 3,840,420 A * 10/1974 Sarcia ................... B32B 37/185
                                                        156/359

FOREIGN PATENT DOCUMENTS

CN       2924616 Y    7/2007
CN     201006634 Y    1/2008
(Continued)

*Primary Examiner* — John L Goff, II
(74) *Attorney, Agent, or Firm* — Justin Lampel

(57) ABSTRACT

The present invention discloses a preheating-free laminator, wherein, the rubber feeding detection device, feed drive device, rubber feeding roller set, and heating component are electrically connected to the control device respectively; the feed drive device that receives the feeding signal drives the rubber feeding roller set for feeding fit, the laminated substance passes the rubber feeding channel and enters the rubber roller set under the feeding action of the rubber feeding roller set, and its feeding time is t1; after receiving the preheating signal, the heating component runs to generate heat, so that the rubber roller set is heated to the lamination temperature, and its heating time is t2; and the feeding time t1 and the heating time t2 meet the condition that t1 is greater than or equal to t2. Compared with the prior art, it can realize the functions of preheating-free and automatic shutdown of the laminator, which is convenient to use, energy saving and environmentally friendly.

10 Claims, 6 Drawing Sheets

(58) Field of Classification Search
USPC ................ 156/351, 359, 363, 364, 367, 368
See application file for complete search history.

(56) References Cited

FOREIGN PATENT DOCUMENTS

| | | | |
|---|---|---|---|
| CN | 204160847 U | | 2/2015 |
| CN | 107415405 A | | 12/2017 |
| CN | 109318473 A | | 2/2019 |
| CN | 109318567 A | | 2/2019 |
| CN | 210047709 U | | 2/2020 |
| CN | 216127767 U | | 3/2022 |
| DE | 202021105675 U1 | | 11/2021 |
| JP | S6337924 A | * | 2/1988 |
| JP | S6337925 A | | 2/1988 |
| JP | 2004025530 A | * | 1/2004 |
| JP | 2006264807 A | | 10/2006 |

* cited by examiner

PREHEATING-FREE LAMINATOR

TECHNICAL FIELD

The present invention relates to the technical field of laminator, in particular to a preheating-free laminator.

BACKGROUND ART

Generally, the power consumption of an electronic and electrical product in standby mode is generally about 10% of its startup power. Although in recent years, the European Commission has published a motion on implementing regulations for the 2005/32/EC Environmental Design Directive, which aims to reduce the energy consumption of all household and office electrical and electronic equipment in shutdown and standby modes. The motion pointed out that the maximum power consumption standard of electronic and household appliances produced and sold in the EU market in standby mode must be reduced to 1 to 2 watts per hour by 2010, and to 0.5 to 1 watt per hour by 2013; and at the same time, electronic and electrical products are required to be designed with the standby power management function. Nevertheless, if electronic and electrical products are on standby for a long time, the accumulated power consumption is also quite large.

In addition, the heating method of the traditional laminator adopts heating wire heating or PTC heating. These two heating methods rely on the medium to conduct heat to the roller, and the heat loss is serious, and thus it takes a relatively long time to reach the lamination temperature. Moreover, the thermal efficiency of the heating wire and PTC heating material is also low, which greatly increases the power consumption of the laminator. Another type of laminator heated by the quartz tube is heated by conduction and radiation, which speeds up the preheating time, but the preheating time is still relatively long, about 1 minute to 1.5 minutes.

SUMMARY OF THE INVENTION

The purpose of the present invention is to provide a preheating-free laminator, eliminating preheating waiting time, reducing energy consumption, and being green and environmentally friendly.

In order to achieve the above purpose, the technical solution adopted by the present invention is: a preheating-free laminator, comprising a body, a lamination inlet arranged on the front side of the body, a lamination outlet arranged on the rear side of the body, a movement assembly arranged inside the body, and a control device; a rubber feeding detection device and a rubber feeding roller set are arranged at the lamination inlet, a rubber feeding channel is arranged between the rubber feeding is roller set and the movement assembly, a rubber roller set and a heating component arranged close to the rubber roller set are arranged inside the movement assembly, and a feed drive device is connected with the rubber feeding roller set in transmission; wherein, the rubber feeding detection device, feed drive device, rubber feeding roller set, and heating component are electrically connected to the control device respectively; when the laminated substance passes through the lamination inlet, the rubber feeding detection device is triggered and sends a rubber feeding signal to the control device, and the control device sends a feeding signal to the feed drive device, and at the same time sends a preheating signal to the heating component; the feed drive device that receives the feeding signal drives the rubber feeding roller set for feeding fit, the laminated substance passes the rubber feeding channel and enters the rubber roller set under the feeding action of the rubber feeding roller set, and its feeding time is t1; after receiving the preheating signal, the heating component runs to generate heat, so that the rubber roller set is heated to the lamination temperature, and its heating time is t2; and the feeding time t1 and the heating time t2 meet the condition that t1 is greater than or equal to t2.

Compared with the prior art, the advantages of the present invention are as follows: The present invention provides a preheating-free laminator. By arranging the rubber feeding detection device electrically connected to the control device at the lamination inlet, it is possible to start heating only after sensing that the coating is inserted into the inlet. In addition, when there is no new rubber inserted, the power supply of the heating component is automatically cut off after the set time to stop is heating, and only a part of the circuit with very low power consumption is kept in standby mode. In standby mode, the heating component is not energized and does not compensate for temperature. There is no need to heat the rubber roller continuously or intermittently during the continuous lamination process, which is energy saving and environmentally friendly. A rubber feeding channel is arranged between the rubber feeding roller set and the rubber roller set at the rubber feeding port, so that the laminated substance is pushed between the rubber roller sets to form the rubber feeding time, so as to strive for the heating time of the rubber roller set and achieve the technical effect of avoiding preheating. There is a linear speed difference between the rubber feeding roller set and the rubber roller set, so that the laminated substance remains tight during the lamination process, avoiding wrinkles and other undesirable factors, and improving the quality of lamination.

DETAILED DESCRIPTION OF EMBODIMENTS

Figure 1:
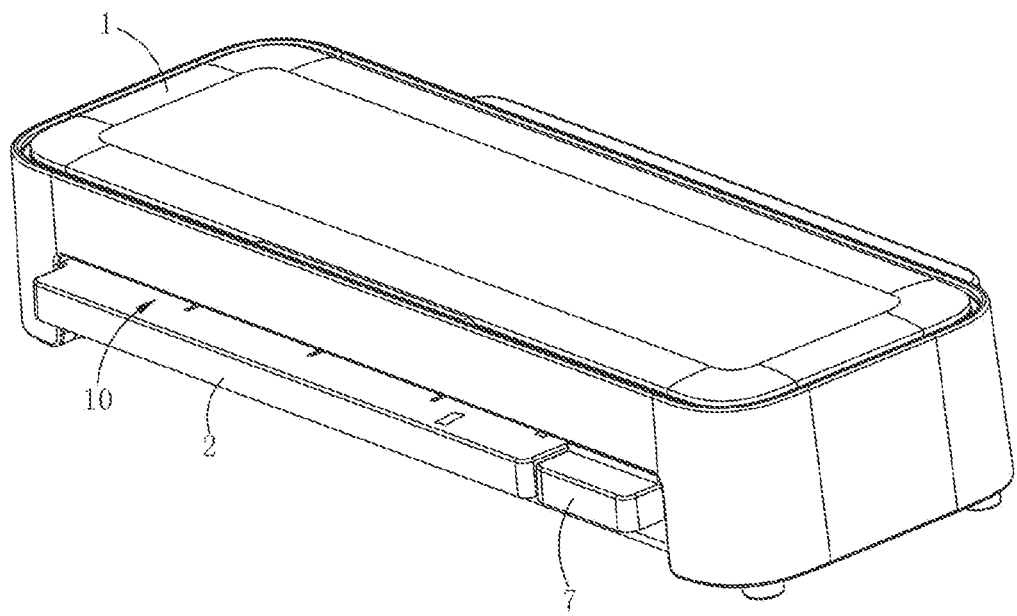
FIG. 1 is a structural schematic diagram of the present invention.
Figure 2:
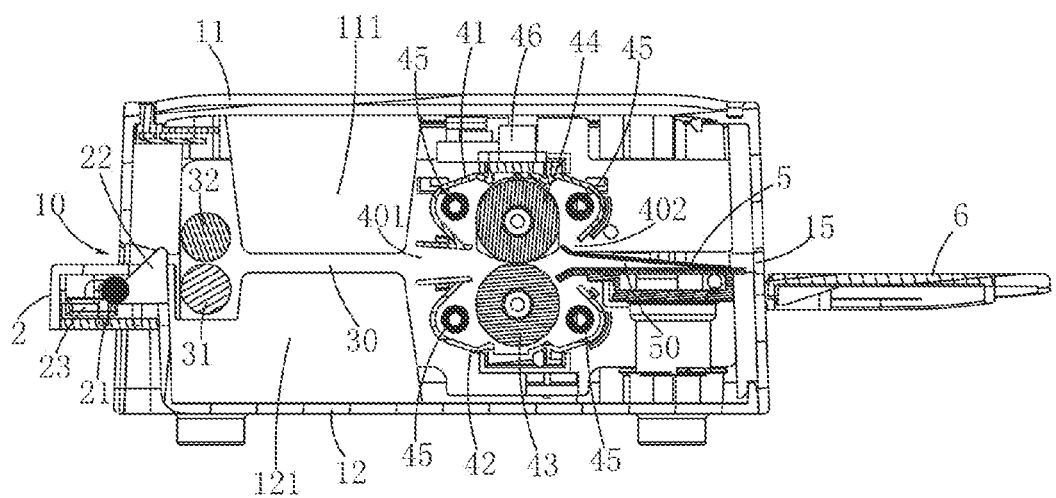
FIG. 2 is a cross-sectional schematic diagram of the present invention.
Figure 3:
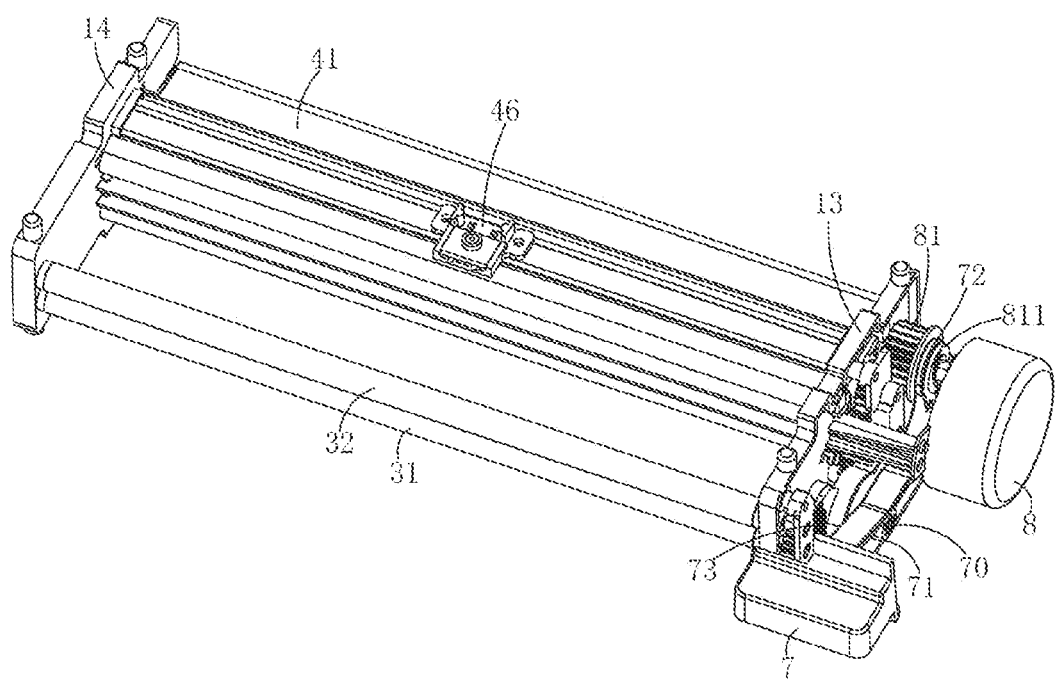
FIG. 3 is a structural schematic diagram of the movement assembly in the present invention.
Figure 4:
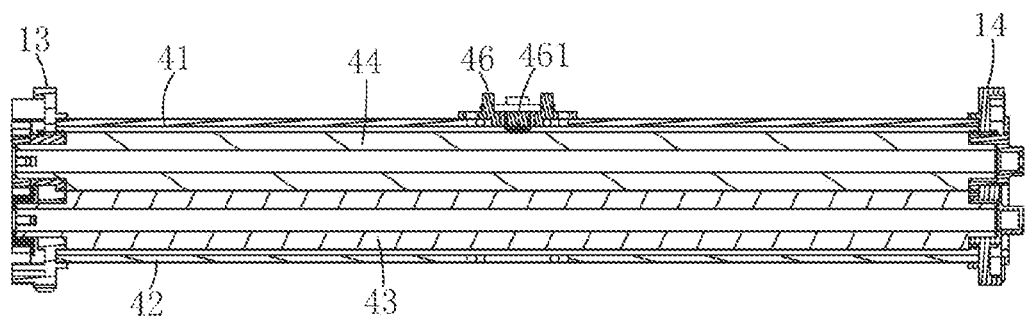
FIG. 4 is a cross-sectional schematic diagram of the movement assembly in the present invention.
Figure 5:
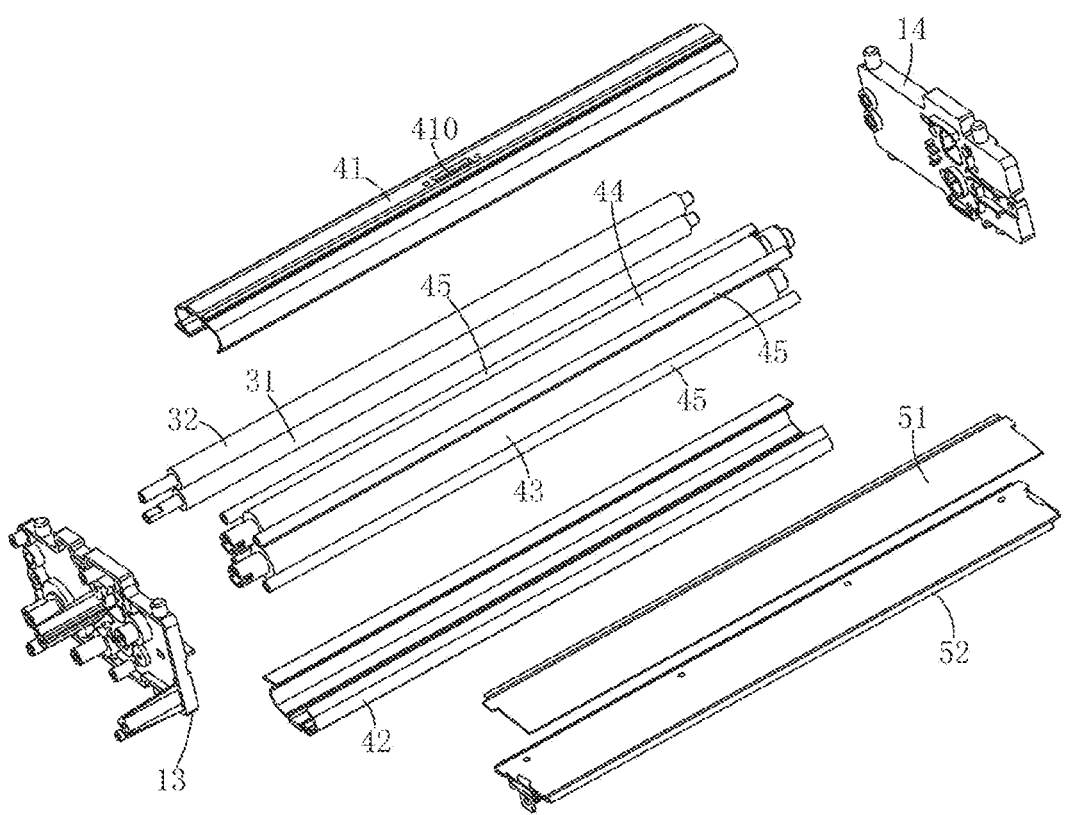
FIG. 5 is a decomposition schematic diagram of the movement assembly in the present invention.
Figure 6:
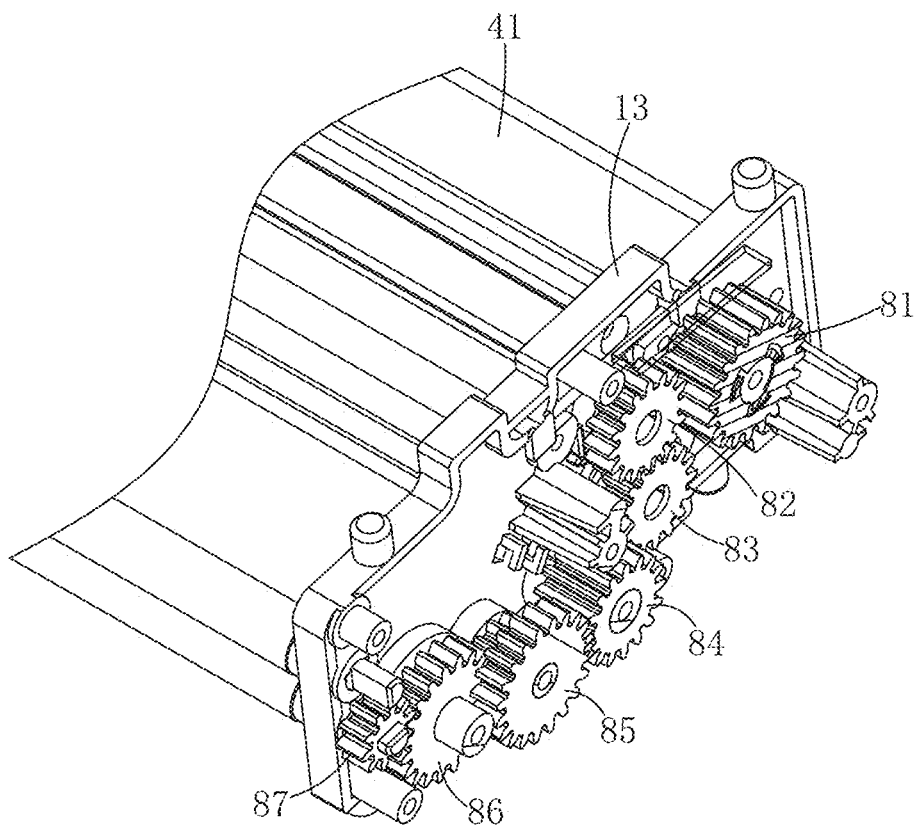
FIG. 6 is a local structural schematic diagram of the movement assembly in the present invention.
Figure 7:
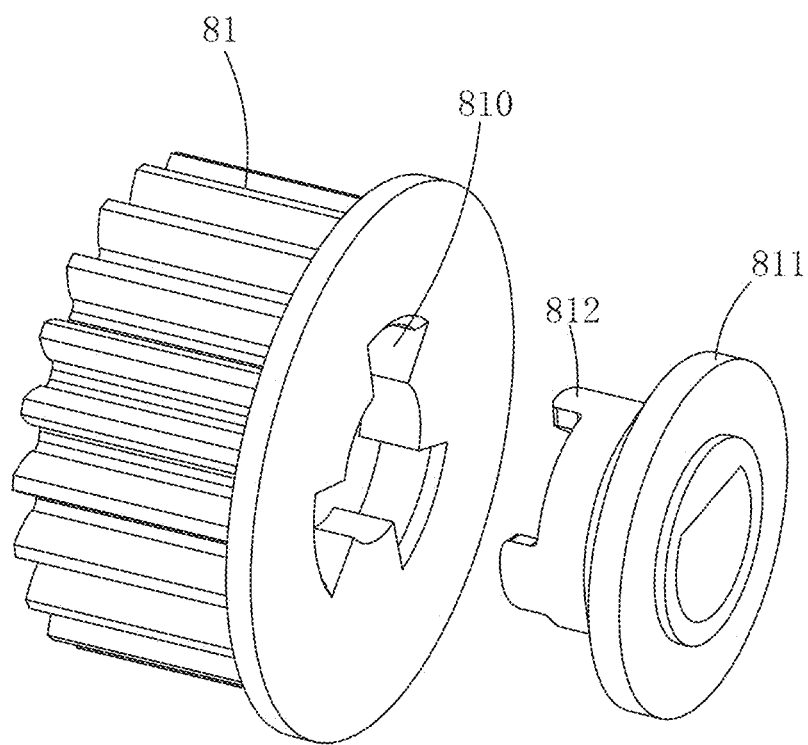
FIG. 7 is a decomposition schematic diagram of the main drive gear in the present invention.
Figure 8:
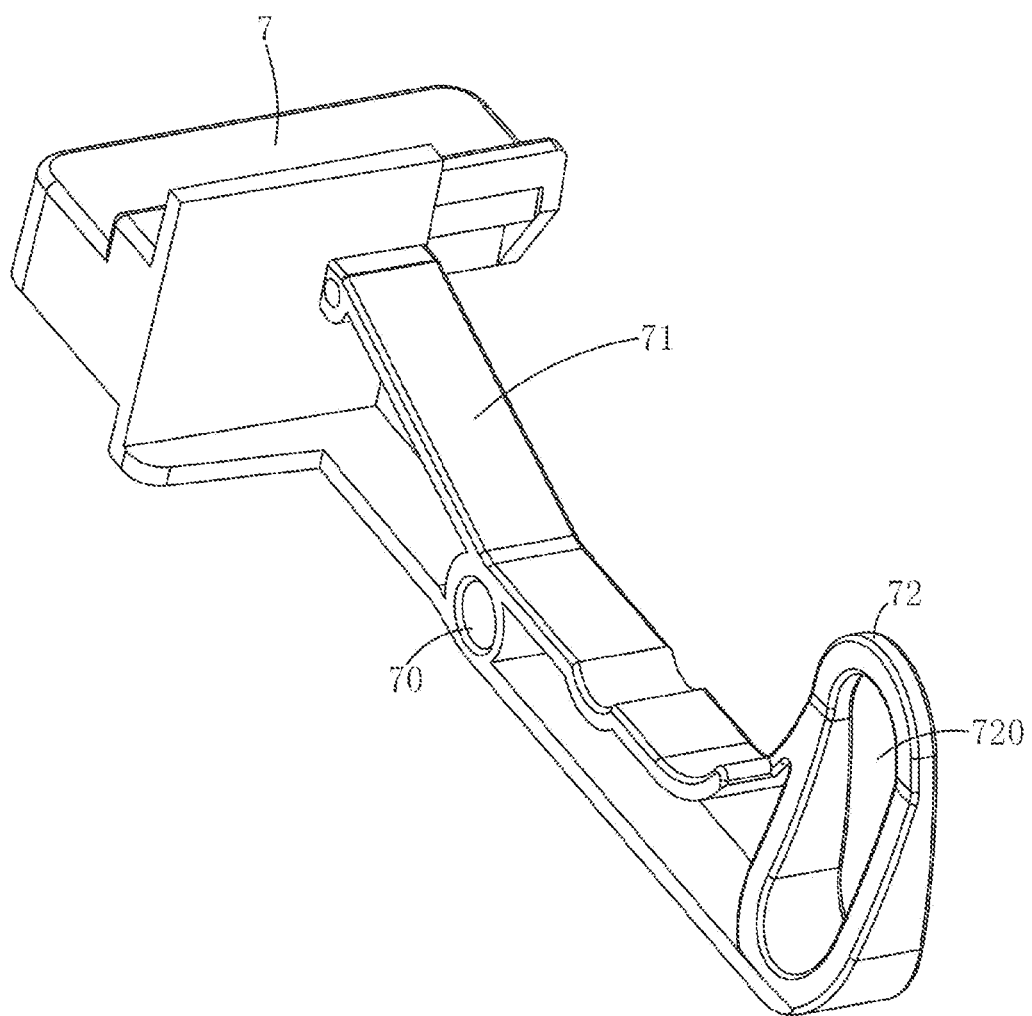
FIG. 8 is a structural schematic diagram of the clutch handle in the present invention.

A preheating-free laminator, as shown in FIGS. 1 to 8, comprising a body 1, a lamination inlet 10 arranged on the front side of the body 1, a lamination outlet 15 arranged on the rear side of the body 1, a movement assembly arranged inside the body 1, and a control device, wherein: a rubber feeding detection device and a rubber feeding roller set are arranged at the lamination inlet 10, a rubber feeding channel 30 is arranged between the rubber feeding roller set and the movement assembly, a rubber roller set and a heating component arranged close to the rubber roller set are arranged inside the movement assembly, and a feed drive device is connected with the rubber feeding roller set in transmission; wherein, the rubber feeding detection device, feed drive device, rubber feeding roller set, and heating component are electrically connected to the control device respectively; when the laminated substance passes through the lamination inlet 10, the rubber feeding detection device is triggered and sends a rubber feeding signal to the control device, and the control device sends a feeding signal to the feed drive device, and at the same time sends a preheating signal to the heating component; the feed drive device that receives the feeding signal drives the rubber feeding roller set for feeding fit, the laminated substance passes the rubber feeding channel 30 and enters the rubber roller set under the feeding action of the rubber feeding roller set, and its feeding time is t1; after receiving the preheating signal, the heating component runs to generate heat, so that the rubber roller set is heated to the lamination temperature, and its heating time is t2; and the feeding time t1 and the heating time t2 meet the condition that t1 is greater than or equal to t2. By arranging the rubber feeding detection device electrically connected to the control device at the lamination inlet 10, and arranging the rubber delivery detection device electrically connected to the control device at the lamination outlet 15, it is possible to start heating only after sensing that the coating is inserted into the inlet. After the coating passes through the outlet, the power supply of the heating component is cut off to stop heating, and only a part of the circuit with very low power consumption is kept in standby mode. In standby mode, the heating component is not energized and does not compensate for temperature. There is no need to heat the rubber roller continuously or intermittently during the continuous lamination process, which is energy saving and environmentally friendly. A rubber feeding channel 30 is arranged between the rubber feeding roller set and the rubber roller set at the rubber feeding port, so that the laminated substance is pushed between the rubber roller sets to form the rubber feeding time, so as to strive for the heating time of the rubber roller set and achieve the technical effect of avoiding preheating.

A rubber delivery detection device is arranged at the lamination outlet 15, which is electrically connected to the control device; when the laminated substance passes through the lamination outlet 15, the rubber delivery detection device is triggered and sends a rubber delivery signal to the control device, and the control device sends a stop signal to the heating component to control the heating component to stop heating.

It further comprises a power supply device, and the control device, the feed drive device and the movement assembly are respectively connected to the power supply device; the rubber feeding detection device is arranged with a timing module used to control the automatic shutdown of the laminator, the timing module is connected to the control device in communication, and the timing module is preset with a preset value of the shutdown time; when the laminated substance is separated from the trigger rubber feeding detection device, the timing module starts timing, and the control device reads the timing time of the timing module in real time or on a regular basis; when the read timing time is greater than or equal to the preset value of the shutdown time, the control device controls the power supply device to disconnect the power supply to realize automatic shutdown. The timing module is set to record the accumulated time after the laminated substance completely passes through the lamination inlet 10, so as to control the laminator to automatically shut down after the accumulated time of the set time, and to avoid the complete machine from continuing to idling, thereby saving energy and electricity.

The body 1 comprises an upper case 11 and a lower case 12, a plurality of upper fins 111 arranged at intervals are formed inside the front side of the upper case 11, a plurality of lower fins 121 arranged at intervals are formed inside the front side of the lower case 12, and the upper fins 111 and the lower fins 121 are aligned or staggered; the bottom surface of each upper fin 111 is horizontally aligned to form a top surface of the rubber feeding channel 30, and the top edge of each lower fin 121 is horizontally aligned to form a bottom surface of the rubber feeding channel 30; when the upper case 11 and the lower case 12 are assembled, each upper fin 111 and lower fin 121 exactly forms a rubber feeding channel 30 of a set height; the height of the rubber feeding channel 30 is 0.5 cm to 1 cm, which is set according to the laminators of different specifications and sizes, and is not limited.

The rubber feeding detection device can adopt a non-contact or contact detection mechanism. Preferably, a rubber feeding pallet 2 is arranged at the lamination inlet 10, a rubber feeding trigger shaft 21 is rotatably mounted inside the rubber feeding pallet 2, and a torsion spring is connected between the rubber feeding trigger shaft 21 and the rubber feeding pallet 2; the rubber feeding trigger shaft 21 is arranged with multi-axially aligned trigger fins 22 at intervals along its axis, and each trigger fin 22 movably blocks the lamination inlet 10 respectively; a micro switch 23 is arranged at the end of the rubber feeding trigger shaft 21, and is electrically connected to the control device; when the laminated substance passes through the lamination inlet 10, the rubber feeding trigger shaft 21 triggers the micro switch 23. Such contact rubber feeding detection structure has lower cost and is easier to promote.

The linear speed of the rubber roller set is greater than that of the rubber feeding roller set, and the static friction between the rubber roller set and the laminated substance is greater than that between the rubber feeding roller set and the laminated substance; when the laminated substance passes through the rubber feeding channel 30 and enters the rubber roller set under the feeding action of the rubber feeding roller set, the rubber feeding roller set and the rubber roller set are respectively roll-fitted with the front and rear sides of the laminated substance, and there is a sliding friction fit between the rubber feeding roller set and the laminated substance, and a static friction fit between the rubber roller set and the laminated substance; and the rubber feeding roller set comprises an active rubber feeding roller 31 and a passive rubber feeding roller 32 which are arranged parallel to each other, and the active rubber feeding roller 31 is connected with the feed drive device in transmission.

The roller surface of the active rubber feeding roller 31 and the passive rubber feeding roller 32 comprise a metal roller respectively; the roller surfaces of metal rollers are smoothly arranged, and there is a lamination sliding structure between these two metal rollers; the lamination sliding structure comprises any one of a roller surface clearance structure and an elastic roller set structure; wherein, in the roller surface clearance structure, a rubber feeding clearance is formed between the roller surface of the active rubber feeding roller 31 and the roller surface of the passive rubber feeding roller 32, and the rubber feeding clearance is less than the thickness of the laminated substance; and in the elastic roller set structure, the roller surface of the active rubber feeding roller 31 and the roller surface of the passive rubber feeding roller 32 are movably fitted with each other by abutting, both ends of the passive rubber feeding roller 32 are respectively connected with an elastic structure, and the passive rubber feeding roller 32 is used for elastic floating fit in the up and down directions. Such lamination sliding structure can ensure sufficient static friction between the laminated substance and the rubber feeding roller set while avoiding slippage between the pressure roller component and the laminated substance, ensure smooth heat sealing of the laminated substance, and avoid excessive hot pressing and thus cause heat sealing of the laminated substance to fail.

The movement assembly is arranged with a movement shell; the movement shell comprises an upper core shell 41 and a lower core shell 42 arranged symmetrically up and down; the upper core shell 41 and the lower core shell 42 are spaced apart to form a heat-sealed inlet 401 and a heat-sealed outlet 402; the heat-sealed inlet 401 is located on the front side of the movement shell and communicates with the rubber feeding channel 30, and the heat-sealed outlet 402 is located on the rear side of the movement shell and communicates with the lamination outlet 15; the rubber roller set is located inside the movement shell; the rubber roller set comprises an upper pressing roller 44 and a lower pressing roller 43 of the same specification converged up and down; a heating tube 45 is arranged on the front and rear sides of the upper pressing roller 44 respectively, and a thermal radiation clearance is left between these two heating tubes and the upper pressing roller 44; another heating tube 45 is arranged on the front and rear sides of the lower pressing roller 43 respectively, and another thermal radiation clearance is left between these two heating tubes 45 and the lower pressing roller 43. The heating tubes respectively arranged on the front and rear sides of the upper pressing roller 44 and the lower pressing roller 43 enable the upper pressing roller 44 and the lower pressing roller 43 to reach the lamination temperature faster and shorten the heating time; and enable the upper pressing roller 44 and the lower pressing roller 43 to reach the lamination temperature when the front side of the laminated substance completely passes through the rubber feeding channel 30, which meets the heating requirements of the preheating-free laminator.

A lamination leveling mechanism 5 is arranged between the heat-sealed outlet 402 and the lamination outlet 15; the lamination leveling mechanism 5 comprises a leveling bottom plate 52 and a leveling pressure plate 51; the leveling pressure plate 51 is elastically mounted on the top of the leveling bottom plate 52, and the leveling pressure plate 51 is arranged in an inclined manner; a leveling channel 50 that gradually converges from the inside to the outside is formed between the leveling bottom plate 52 and the leveling pressure plate 51; the inner opening of the leveling channel 50 is connected to the heat-sealed outlet 402, and the outer opening is connected to the lamination outlet 15. The lamination leveling mechanism 5 is mounted in the rear channel between the rubber roller and the outlet, and the heating temperature of the leveling bottom plate 52 for coating is lower than that of the rubber roller, which has a heat preservation effect, slowing down the cooling rate of the coating, avoiding wrinkles or wavy lines caused by rapid cooling of the coating after lamination, and improving the quality of lamination.

A rubber delivery roller set is arranged at the lamination outlet 15, and the rubber delivery roller set is connected to the feed drive device in transmission; the linear speed of the rubber delivery roller set is greater than that of the rubber roller set, and the static friction between the rubber delivery roller set and the laminated substance is less than that between the rubber roller set and the laminated substance; when the laminated substance passes through the leveling channel 50 and enters the rubber delivery roller set under the feeding action of the rubber roller set, the rubber delivery roller set and the rubber roller set are respectively roll-fitted with the front and rear sides of the laminated substance, and there is a sliding friction fit between the rubber delivery roller set and the laminated substance, and a static friction fit between the rubber roller set and the laminated substance. By arranging the rubber delivery roller set at the outlet to suck up the coating, the coating between the rubber roller set and the rubber delivery roller set is tightened to avoid wrinkles or wavy lines on the laminated coating, and further improve the quality of lamination.

A rubber delivery pallet 6 is also arranged at the lamination outlet 15; the rubber delivery pallet 6 is movably connected to the body 1, and a limit structure is arranged between the rubber delivery pallet 6 and the body 1; the surface of the rubber delivery pallet 6 and the lamination outlet 15 are arranged flush, leaving a plane supporting effect on the softer laminated substance with a higher rubber delivery temperature, so as to avoid bending and shaping of the laminated substance under the action of gravity, thereby affecting the quality of lamination. The rubber delivery pallet 6 can be a split design or a rotary folding design, which has the advantage of facilitating storage.

A temperature detection device 46 is arranged in the middle position of the upper core shell 41, the temperature detection device 46 is electrically connected to the control device, and the temperature detection device 46 comprises an infrared temperature sensing unit or a thermocouple 461. Preferably, a through hole 410 is arranged in the middle position of the upper core shell 41, the temperature detection device 46 is fixed at the through hole 410, and the selected thermocouple 461 extends into the inside of the movement shell through the through hole 410 and contacts the upper pressing roller 44, so as to monitor the roller surface temperature of the upper pressing roller 44 in real time. The structure is simple and reliable, the cost is low, and the service life is long.

A first side plate 13 and a second side plate 14 are arranged on the left and right sides inside the body 1 respectively, a movement assembly space is formed in the space between the first side plate 13 and the second side plate 14, and the active rubber feeding roller 31, the passive rubber feeding roller 32, the upper core shell 41, the lower core shell 42, the upper pressing roller 44, the lower pressing roller 43 and each of the heating tubes 45 are inserted and mounted in the movement assembly space respectively; a transmission gear set structure is arranged on the outer side of the first side plate 13, comprising a main drive gear 81, a pressure roller gear set, a variable gear set, and a rubber feeding roller gear 87 that are sequentially meshed and connected along the power transmission direction, and the main drive gear (81) is connected to the feed drive device in transmission; wherein, the pressure roller gear set comprises a main pressure roller gear 82 and an auxiliary pressure roller gear 83 of the same specification which are meshed with each other, the main pressure roller gear 82 and the auxiliary pressure roller gear 83 are coaxially mounted on the upper pressing roller 44 and the lower pressing roller 43 respectively, and the main drive gear 81 is meshed and connected with the main pressure roller gear 82; the rubber feeding roller gear 87 is coaxially mounted on the active rubber feeding roller 31; a transmission ratio i is formed between the main pressure roller gear 82 and the rubber feeding roller gear 87; the radius of the upper pressing roller 44 and the lower pressing roller 43 is R1, and the radius of the active rubber feeding roller 31 is R2, which meets the condition of R1×i>R2.

The transmission gear set comprises a first gear 84, a second gear 85 and a third gear 86 that are sequentially meshed; wherein, the first gear 84 meshes with either the main pressure roller gear 82 or the auxiliary pressure roller gear 83; the second gear 85 is double-layer large and small gears; the large gear of the double-layer large and small gears meshes with the first gear 84, and the small gear of the double-layer large and small gears meshes with the second gear 85; through the combination of different transmission ratios, a fixed transmission ratio between the rubber roller set and the rubber feeding roller set of a fixed size is formed, so that two sets of roller sets can be driven by one power source at the same time, and the linear speed difference of the two roller sets can be realized; the structure is stable and reliable, the cost is low, and it is easy to promote; the feed drive device comprises a drive motor 8 electrically connected to the control device; a clutch structure is arranged between the main drive gear 81 and the motor shaft of the drive motor 8, the clutch structure comprises a clutch handle 7 rotatably mounted on the body 1 and a clutch plug slidably sleeved on the motor shaft, a return spring 73 is connected between the clutch handle 7 and the body 1, and a compression spring is connected between the clutch plug and the motor shaft; wherein, a clutch socket 810 is arranged on the outside of the main drive gear 81; the outer end of the clutch plug is formed with a plug-in portion 812 matching the shape and size of the clutch socket 810, the plug-in portion 812 of the clutch plug is movably plugged into the clutch socket 810 of the main drive gear 81, and an abutting ring 811 is formed on the inside of the clutch plug; a clutch pushing portion 72 is formed on the end of the clutch handle 7, a pushing slope that gradually narrows from bottom to top is formed on the outer side of the clutch pushing portion 72, the clutch pushing portion 72 is arranged with a connecting groove 720, the connecting groove 720 is movably sleeved on the clutch plug, and the pushing slope is fitted with the abutting ring 811 by sliding and abutting.

The clutch handle 7 is an integrally formed elongated lever handle 71, a shaft hole 70 is formed in the middle of the lever handle 71, and the lever handle 71 is rotatably mounted inside the body 1 through the shaft hole; with the shaft hole 70 as the boundary, a pressing portion is formed on the front side of the lever handle 71, and the clutch pushing portion 72 is formed with the rear side of the lever handle 71. By pressing the pressing portion, the lever handle 71 is rotated around its shaft hole 70, the clutch pushing portion 72 rotates upwards, the abutting ring 811 of the clutch plug is pushed through its pushing slope, and the clutch plug and the plug-in portion 812 are driven to exit the clutch socket 810, so as to realize the transmission separation between the drive motor 8 and the main drive gear 81. Such emergency braking mechanism can brake immediately when a lamination accident occurs, the roller set is stopped from continuing pushing the laminated substance, and then the laminated substance is pulled out by human hands to stop the lamination.

The invention claimed is:

1. A preheating-free laminator, comprising a body (1), a lamination inlet (10) arranged on a front side of the body (1), a lamination outlet (15) arranged on a rear side of the body (1), a movement assembly arranged inside the body (1), and a control device, wherein: a rubber feeding detection device and a rubber feeding roller set are arranged at a lamination inlet (10), a rubber feeding channel (30) is arranged between the rubber feeding roller set and the movement assembly, a rubber roller set and a heating component arranged close to the rubber roller set are arranged inside the movement assembly, and a feed drive device is connected with the rubber feeding roller set in transmission; wherein the rubber feeding detection device, feed drive device, rubber feeding roller set, and heating component are electrically connected to the control device respectively; when a laminated substance passes through the lamination inlet (10), the rubber feeding detection device is triggered and sends a feeding signal to the control device, and the control device sends a feeding signal to the feed drive device, and at the same time sends a preheating signal to the heating component;

the feed drive device that receives the feeding signal drives the rubber feeding roller set for feeding fit, the laminated substance passes the rubber feeding channel (30) and enters the rubber roller set under the feeding action of the rubber feeding roller set, and its feeding time is t1;

after receiving the preheating signal, the heating component runs to generate heat, so that the rubber roller set is heated to a lamination temperature, and its heating time is t2; and the feeding time t1 and the heating time t2 meet the condition that t1 is greater than or equal to t2.

2. The preheating-free laminator according to claim 1, further comprising a power supply device, and the control device, the feed drive device and the movement assembly are respectively connected to the power supply device; the rubber feeding detection device is arranged with a timing module used to control an automatic shutdown of the laminator, the timing module is connected to the control device in communication, and the timing module is preset with a preset value of a shutdown time; when the laminated substance is separated from a trigger rubber feeding detection device, the timing module starts timing, and the control device reads the timing time of the timing module in real time or on a regular basis; when the read timing time is greater than or equal to the preset value of the shutdown time, the control device controls the power supply device to disconnect the power supply to realize automatic shutdown.

3. The preheating-free laminator according to claim 2, wherein a linear speed of the rubber roller set is greater than that of the rubber feeding roller set, and a static friction between the rubber roller set and the laminated substance is greater than that between the rubber feeding roller set and the laminated substance; when the laminated substance passes through the rubber feeding channel (30) and enters the rubber roller set under the feeding action of the rubber feeding roller set, the rubber feeding roller set and the rubber roller set are respectively roll-fitted with a front and rear sides of the laminated substance, and there is a sliding friction fit between the rubber feeding roller set and the laminated substance, and a static friction fit between the rubber roller set and the laminated substance; and the rubber feeding roller set comprises an active rubber feeding roller (31) and a passive rubber feeding roller (32) which are arranged parallel to each other, and the active rubber feeding roller (31) is connected with the feed drive device in transmission.

4. The preheating-free laminator according to claim 3, wherein a roller surface of the active rubber feeding roller (31) and the passive rubber feeding roller (32) are smoothly arranged, and there is a lamination sliding structure between these two rollers; the lamination sliding structure comprises any one of a roller surface clearance structure and an elastic roller set structure; and in the elastic roller set structure, the roller surface of the active rubber feeding roller (31) and the roller surface of the passive rubber feeding roller (32) are movably fitted with each other by abutting, both ends of the passive rubber feeding roller (32) are respectively connected with an elastic structure, and the passive rubber feeding roller (32) is used for elastic floating fit in the up and down directions.

5. The preheating-free laminator according to claim 4, wherein: the movement assembly is arranged with a movement shell; the movement shell comprises an upper core shell (41) and a lower core shell (42) arranged symmetrically up and down; the upper core shell (41) and the lower core shell (42) are spaced apart to form a heat-sealed inlet (401) and a heat-sealed outlet (402); the heat-sealed inlet (401) is located on a front side of the movement shell and communicates with the rubber feeding channel (30), and the heat-sealed outlet (402) is located on a rear side of the movement shell and communicates with the lamination outlet (15); and the rubber roller set is located inside the movement shell; the rubber roller set comprises an upper pressing roller (44) and a lower pressing roller (43) of the same specification converged up and down; a heating tube (45) is arranged on a front and rear sides of the upper pressing roller (44) respectively, and a thermal radiation clearance is left between these two heating tubes (45) and the upper pressing roller (44); another heating tube (45) is arranged on a front and rear sides of the lower pressing roller (43) respectively, and another thermal radiation clearance is left between these two heating tubes (45) and the lower pressing roller (43).

6. The preheating-free laminator according to claim 5, wherein: a lamination leveling mechanism (5) is arranged between the heat-sealed outlet (402) and the lamination outlet (15); the lamination leveling mechanism (5) comprises a leveling bottom plate (52) and a leveling pressure plate (51); the leveling pressure plate (51) is elastically mounted on the top of the leveling bottom plate (52), and the leveling pressure plate (51) is arranged in an inclined manner; a leveling channel (50) that gradually converges from an inside to an outside is formed between the leveling bottom plate (52) and the leveling pressure plate (51); an inner opening of the leveling channel (50) is connected to the heat-sealed outlet (402), and an outer opening is connected to the lamination outlet (15).

7. The preheating-free laminator according to claim 6, wherein a rubber delivery roller set is arranged at the lamination outlet (15), and the rubber delivery roller set is connected to the feed drive device in transmission; a linear speed of the rubber delivery roller set is greater than that of the rubber roller set, and the static friction between the rubber delivery roller set and the laminated substance is less than that between the rubber roller set and the laminated substance;

when the laminated substance passes through the leveling channel (50) and enters the rubber delivery roller set under the feeding action of the rubber roller set, the rubber delivery roller set and the rubber roller set are respectively roll-fitted with the front and rear sides of the laminated substance, and there is a sliding friction fit between the rubber delivery roller set and the laminated substance, and a static friction fit between the rubber roller set and the laminated substance.

8. The preheating-free laminator according to claim 7, wherein a temperature detection device (46) is arranged in a middle position of the upper core shell (41), the temperature detection device (46) is electrically connected to the control device, and the temperature detection device (46) comprises an infrared temperature sensing unit or a thermocouple (461).

9. The preheating-free laminator according to claim 8, wherein a first side plate (13) and a second side plate (14) are arranged on a left and right sides inside the body (1) respectively, a movement assembly space is formed in the space between the first side plate (13) and the second side plate (14), and the active rubber feeding roller (31), the passive rubber feeding roller (32), the upper core shell (41), the lower core shell (42), the upper pressing roller (44), the lower pressing roller (43) and each of the heating tubes (45) are inserted and mounted in the movement assembly space respectively; and a transmission gear set structure is arranged on an outer side of the first side plate (13), comprising a main drive gear (81), a pressure roller gear set, a variable gear set, and a rubber feeding roller gear (87) that are sequentially meshed and connected along a power transmission direction, and the main drive gear (81) is connected to the feed drive device in transmission;

wherein, the pressure roller gear set comprises a main pressure roller gear (82) and an auxiliary pressure roller gear (83) of the same specification which are meshed with each other, the main pressure roller gear (82) and the auxiliary pressure roller gear (83) are coaxially mounted on the upper pressing roller (44) and the lower pressing roller (43) respectively, and the main drive gear (81) is meshed and connected with the main pressure roller gear (82); the rubber feeding roller gear (87) is coaxially mounted on the active rubber feeding roller (31); a transmission ratio i is formed between the main pressure roller gear (82) and the rubber feeding roller gear (87); the radius of the upper pressing roller (44) and the lower pressing roller (43) is R1, and the radius of the active rubber feeding roller (31) is R2, which meets the condition of R1×i>R2.

10. The preheating-free laminator according to claim 9, wherein: the feed drive device comprises a drive motor (8) electrically connected to the control device; a clutch structure is arranged between the main drive gear (81) and a motor shaft of the drive motor (8), the clutch structure comprises a clutch handle (7) rotatably mounted on the body (1) and a clutch plug slidably sleeved on the motor shaft, a return spring (73) is connected between the clutch handle (7) and the body (1), and a compression spring is connected between the clutch plug and the motor shaft; and wherein a clutch socket (810) is arranged on an outside of the main drive gear (81); an outer end of the clutch plug is formed with a plug-in portion (812) matching the shape and size of the clutch socket (810), the plug-in portion (812) of the clutch plug is movably plugged into the clutch socket (810) of the main drive gear (81), and an abutting ring (811) is formed on an inside of the clutch plug; a clutch pushing portion (72) is formed on an end of the clutch handle (7), a pushing slope that gradually narrows from bottom to top is formed on an outer side of the clutch pushing portion (72), the clutch pushing portion (72) is arranged with a connecting groove (720), the connecting groove (720) is movably sleeved on the clutch plug, and the pushing slope is fitted with the abutting ring (811) by sliding and abutting.

\* \* \* \* \*